V. F. MIKOLASEK.
INDICATOR FOR IGNITION AND LIGHTING SYSTEMS.
APPLICATION FILED DEC. 9, 1919.

1,391,560.

Patented Sept. 20, 1921.
3 SHEETS—SHEET 1.

Inventor
Venceslaus F. Mikolasek,

By Fulltime Talbert
Attorney

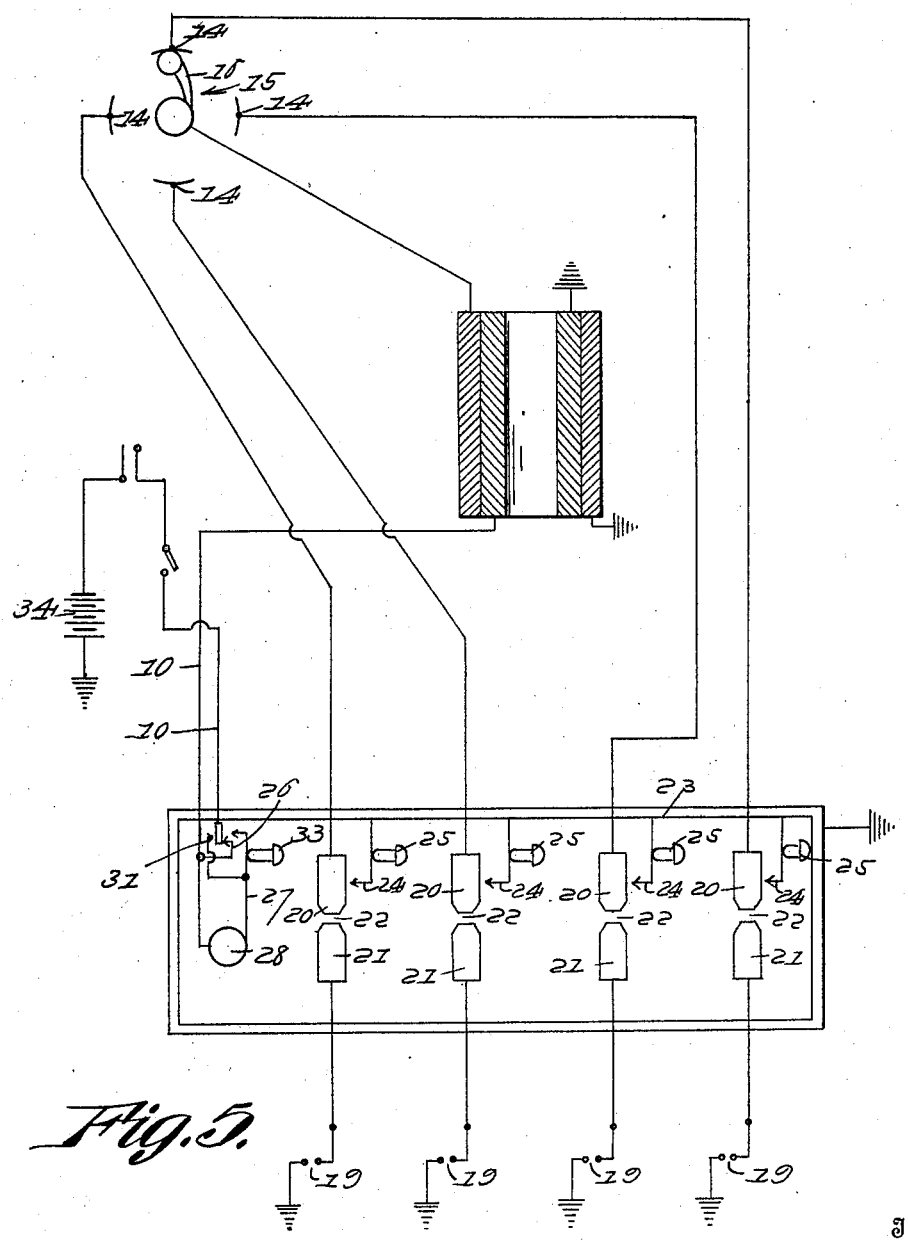

UNITED STATES PATENT OFFICE.

VENCESLAUS F. MIKOLASEK, OF LANKIN, NORTH DAKOTA.

INDICATOR FOR IGNITION AND LIGHTING SYSTEMS.

1,391,560.  Specification of Letters Patent.  Patented Sept. 20, 1921.

Application filed December 9, 1919. Serial No. 343,633.

*To all whom it may concern:*

Be it known that VENCESLAUS F. MIKOLASEK, a citizen of the United States of America, residing at Lankin, in the county of Walsh and State of North Dakota, has invented new and useful Improvements in Indicators for Ignition and Lighting Systems, of which the following is a specification.

The object of the invention is to provide a simple and convenient means whereby the condition of the primary circuit of an ignition or lighting system such, for example, as those employed in connection with automobiles and similar vehicles, to determine whether or not such circuit and the various instrumentalities included therein are properly functioning, and more especially to provide means for the purpose indicated for use in connection with indicators and testing means for determining the condition of the secondary circuits such as that, for example, which is covered in my co-pending application for patent filed June 6, 1919, Serial Number 302,228, to the end that either or both circuits, in their relations to the contacts of the timer may be ascertained by the driver of a vehicle of the type indicated without leaving his post at the steering wheel, and may thus locate with accuracy and without loss of time any defect or maladjustment or disarrangement or obstacle serving to prevent or detract from the efficiency of this essential part of the mechanism of motor driven vehicles, and with this object in view the invention consists in a construction and combination of parts of which a preferred embodiment is illustrated in the accompanying drawing, wherein:

Fig. 5 is a diagrammatic view of the system including a battery, either storage or primary, as the source of energy.

Figure 1:
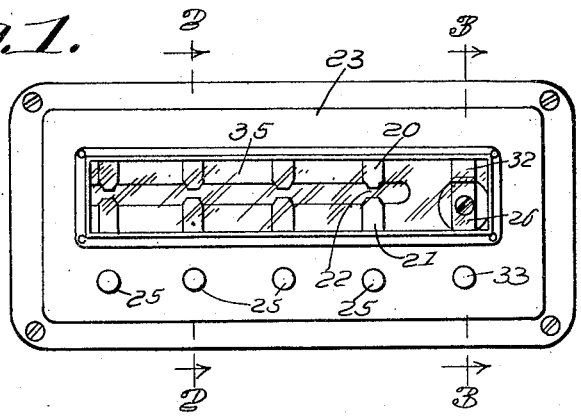
Figure 1 is a view of an indicator including means for testing both primary and secondary or induced circuits such as those employed in connection with the ignition system of an automobile.
Figure 2:
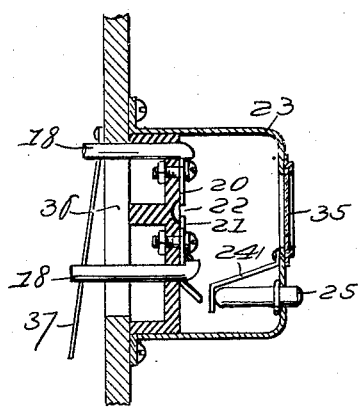
Fig. 2 is a sectional view of the same on the plane indicated by the line 2—2 of Fig. 1.
Figure 3:
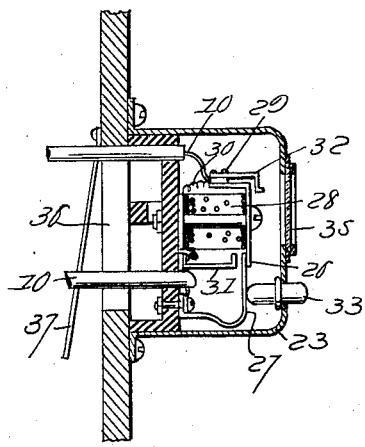
Fig. 3 is a sectional view on the plane indicated by the line 3—3 of Fig. 1.
Figure 4:
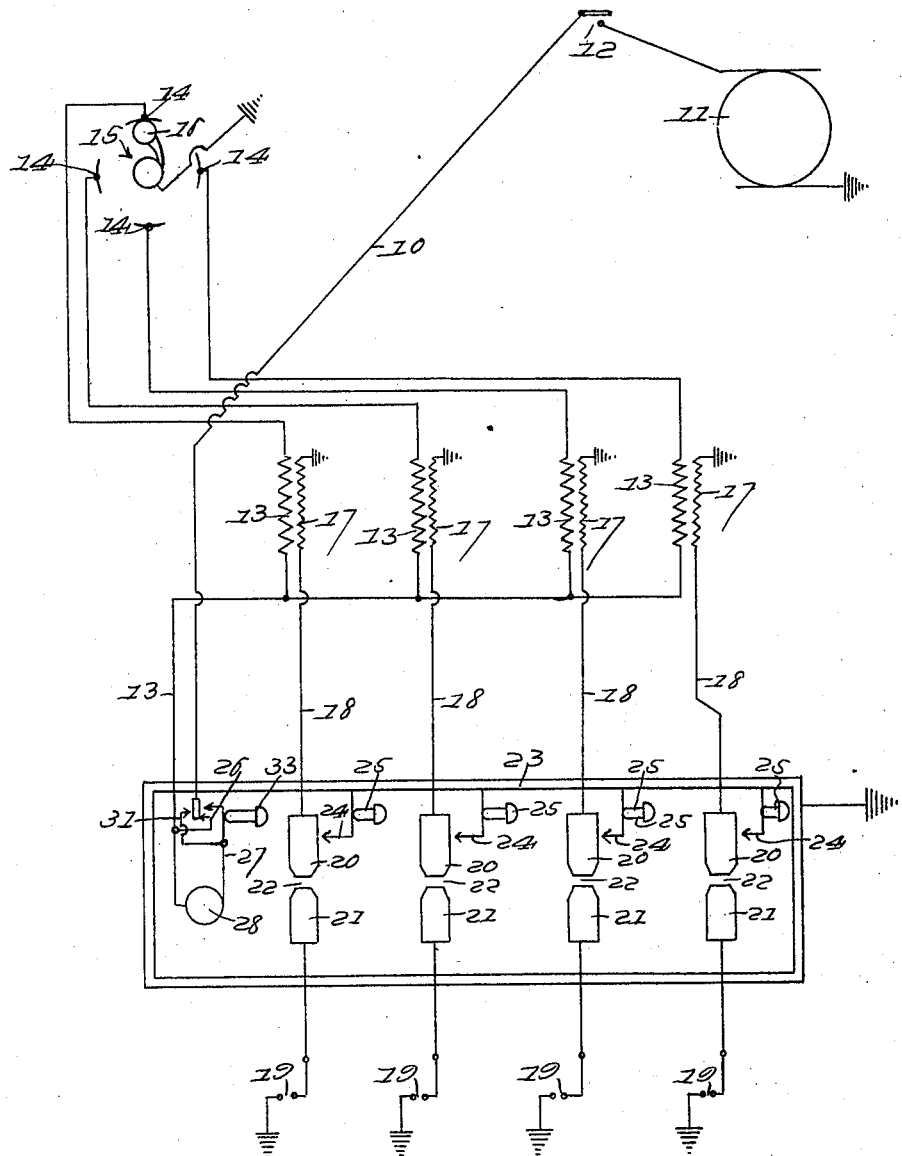
Fig. 4 is a diagrammatic view of the ignition system including the magneto or generator as a source of energy.

In ignition systems of the type indicated the main conductor 10 from the source of energy which as indicated in Fig. 4 may consist of a generator or magneto 11, and is usually provided with a switch 12, extends to the primary elements 13 of the induction coils and thence to the stationary contacts 14 of the timer indicated at 15 and adapted to be successively grounded through said stationary contacts by a rotary contact 16, while the secondary elements 17 of said induction coils are connected by conductors 18 with the spark plugs 19, both ends of the secondary circuit being grounded.

Interposed in the secondary circuits are terminals 20 and 21 spaced to form spark gaps 22 and thus having the additional function of forming intensifiers or condensers, and in order to test the several secondary circuits with convenience said spark gap terminals may be arranged in a suitable casing 23 of a convenient form to be located on the dashboard of the motor vehicle with circuit closers 24 arranged to be brought into contact with the terminals 20 by means of push buttons 25 to ground the secondary circuits and cut out the spark plugs respectively included in these circuits, to the end that by successively short circuiting the several spark plugs the operator, by observing the stroke of the engine in operation can locate the defective circuit. This test will determine whether or not a given secondary circuit or the spark plug included therein is functioning properly, but will not serve to detect any lack of proper functioning in the primary circuit.

Located in the primary circuit, and also preferably arranged in the same casing 23 with the spark gap terminals of the secondary circuits is a circuit breaker having a terminal 26 connected with one of the separated extremities of the main conductor 10 and a terminal 27 connected with the other extremity of said main conductor, said terminals being normally held in contact as by inherent or other spring action to the end that the primary current passes unimpeded therethrough on its way from the generator to the timer contacts as above noted.

As illustrated in the drawings, the terminal 26 may consist of a plate secured to one end of an electro-magnet 28 with the extremity of the conductor secured thereto by a binding screw 29 or the equivalent thereof, the winding of said magnet being connected with the terminal of the primary conductor by a lead 30, while a supplemental terminal 31 arranged in the path of movement of the terminal 27 which is preferably mounted to yield and perform the function of a switch tongue, is also connected with said winding of the magnet to the end that if the contact between the terminals 26 and 27 is broken or interrupted and a contact is established between the terminal 27 and the terminal 31 (which is in circuit with the winding of the electro-magnet) the primary current, instead of traversing the terminals 26 and 27 in its progress through the primary conductor will traverse the coil of the electro-magnet and the terminals 31 and 27. Located within the field of the electro-magnet is a vibratory armature 32 yieldingly held out of contact with the magnet but adapted to be affected thereby when the primary current is shunted through the magnet. In operative relation with the switch tongue 27 is a push button 33 preferably exposed at the front of the casing 23 as are the push buttons 25 of the secondary circuit indicating means but suitably distinguished by color or otherwise therefrom as a guide to the operator, and when said push button 33 is actuated to close the primary circuit through the magnet and the terminals 31 and 27, the grounding of the primary circuit by the timer through the successive engagement of the movable contact with the several stationary contacts will result in causing corresponding vibrations of the armature 32 when the primary circuit in its several branches connected with said stationary contacts is properly functioning, whereas a defect in any one of the branch circuits will be indicated by a failure of said armature to respond.

The above described test is available in connection with the primary circuit when the latter is connected with a battery 34 as a source of energy as indicated in Fig. 5, so that whether the machine is being operated on the magneto or the batteries the operator may ascertain the existence of any deficiency in any of the elements of the primary circuit or in the particular source of energy which may at any given time be included therein, and in connection with the means described for testing the secondary circuits will be enabled at any time to properly locate any trouble in the ignition system.

The face plate of the casing in which the testing mechanism is located is preferably provided with a transparent panel 35 designed to enable the operator to view the spark gaps between the terminals of the secondary circuits and the action of the vibrator or armature 32 of the primary circuit, and also in order to guard against overheating of the terminals there is provided in the base of the casing a ventilating opening 36 fitted, for example, with a suitable dust-excluding guard 37 or the equivalent thereof.

What is claimed is:

1. In an ignition system, a testing device for the primary circuit consisting of a shunt including an indicating element, stationary terminals included respectively in the main and shunt circuits, and a movable terminal included in the main circuit and adapted for engagement with either of said stationary terminals.

2. In an ignition system, a testing device for the primary circuit consisting of a shunt including an electro-magnet, stationary terminals included respectively in the main and shunt circuits and a movable terminal included in the main circuit and adapted for engagement with either of said stationary terminals, and a vibratory armature arranged in the field of the magnet.

3. A testing device for ignition systems having spark gap terminals arranged in the secondary circuits and means for respectively grounding one of the terminals of each circuit, and a switch-controlled shunt circuit included in the primary circuit and including an electro-magnet and a vibratory armature arranged in the field thereof.

4. A testing device for ignition systems having an interiorly ventilated casing, spark gap terminals arranged respectively in the secondary circuits, grounding switch tongues for respective engagement with one terminal of each secondary circuit, a shunt circuit in communication with the primary circuit and including an electro-magnet, stationary terminals included respectively in said primary and shunt circuits, a movable switch tongue also included in said primary circuit and adapted for engagement with either of said stationary terminals, exteriorly exposed means mounted upon said casing in operative relation respectively with said switch tongues of the primary and secondary circuits, and a vibratory armature arranged in the field of said electro-magnet, the face of the casing being provided with a transparent panel through which are exposed said spark gap terminals and said vibratory armature.

In testimony whereof he affixes his signature.

VENCESLAUS F. MIKOLASEK.